United States Patent

Yano et al.

[15] 3,662,098

[45] May 9, 1972

[54] ROTARY HEAD-TYPE VIDEO TAPE MAGNETIC RECORDING AND REPRODUCING SYSTEM

[72] Inventors: Osahiko Yano, Kadoma; Takahiro Nakamura, Neyagawa; Masahiro Deguchi, Yao, all of Japan

[73] Assignee: Matsushita Electric Industrial Co., Ltd., Osaka, Japan

[22] Filed: May 26, 1970

[21] Appl. No.: 40,666

[30] Foreign Application Priority Data

June 3, 1969 Japan....................................44/44948
July 2, 1969 Japan....................................44/53636

[52] U.S. Cl.................178/6.6 P, 179/100.2 S, 179/100.2 T, 340/174.1 A, 340/174.1 P

[51] Int. Cl.....................G11b 5/26, G11b 15/52, H04n 5/78

[58] Field of Search...............178/6.6 A, 6.6 P; 179/100.2 T, 179/100.2 S; 340/174.1 A, 174.1 B, 174.1 P

[56] References Cited

UNITED STATES PATENTS

| | | | |
|---|---|---|---|
| 3,402,350 | 9/1968 | Shellabarger | 179/100.2 S |
| 3,549,797 | 12/1970 | Dann | 178/6.6 P |
| 3,213,193 | 10/1965 | Konishi | 178/6.6 P |

*Primary Examiner*—Howard W. Britton
*Attorney*—Stevens, Davis, Miller & Mosher

[57] ABSTRACT

A rotary head-type video tape magnetic recording and reproducing system in which, at the time of recording, pulse signals are not only recorded on a running magnetic tape but are regenerated and a tape driving system is controlled in such a manner that the regenerated signals maintain a fixed phase relation with a reference signal; and in which, at the time of reproduction, said pulse signals are regenerated and the tape driving system is so controlled that the regenerated signals and a reference signal maintain a fixed relation between each other, thus facilitating the compiling and recording operation of the magnetic tape.

2 Claims, 5 Drawing Figures

O. YANO,
T. NAKAMURA
AND
M. DEGUCHI
INVENTORS

BY Stevens, Davis, Miller & Mosher
ATTORNEYS

INVENTOR

BY

ATTORNEY

INVENTOR

BY

ATTORNEY

INVENTOR

BY

ATTORNEY

ROTARY HEAD-TYPE VIDEO TAPE MAGNETIC RECORDING AND REPRODUCING SYSTEM

The present invention relates to a system comprising a novel means for controlling the magnetic tape feed to maintain it at a predetermined level, as applied to a control system for a video tape magnetic recording and reproducing system, to thereby not only heighten the accuracy of the control but to stabilize the electronic compiling operation of the recording tape from the standpoint of a servo-system.

With reference to a capstan servomechanism for feeding the magnetic tape, conventional recorders employ a method (Japanese Pat. Publication No. 4181/56) in which a reference timing signal is additionally recorded at the edge of a magnetic tape at the same time that information is recorded, and in which the above signal is regenerated at the time of reproduction to control the capstan driving system. This method is intended to match the reproducing tape speed with the recording tape speed. Therefore, if there is any wow/flutter of the tape running speed at the time of recording, the tape is driven at the time of reproduction in such a way that the reproduction wow/flutter agrees with the recording wow/flutter. In the case of a rotary head-type helical scan video tape recording and reproducing apparatus, a field of image signal is recorded as a piece of oblique track by a rotary head irrespective of the above-mentioned irregularity of tape feeding speed. So, if there is wow/flutter at the time of recording, an irregularity will develop in a relative speed with the rotary head which rotates at a fixed speed and image signals will be recorded on the recording tape in such a way that the locations of information signals are staggered to the degree of the irregularity of the above-mentioned relative speed.

Assume that a capstan servo-type tracking control system is employed in which, at the time of reproduction, a phase comparison is made between rotational position signals detected from the rotary head shaft rotating at a fixed speed and control signals which are regenerated after being recorded at the edge of the tape at the time of recording; and in which the tape feed at the time of reproduction is controlled in such a manner that the reproducing operation of the rotary head follows the recording loci. Then, the control signals are recorded in a staggered fashion at the tape edge due to the tape speed wow/flutter in the tape-running system at the time of recording, and the tape feeding speed at the time of reproducing is so controlled as to be in the same condition as at the time of recording. As long as this control is performed with accuracy fulfilling exactly the same condition as at the time of recording, there will be no problem. In controlling the speed of a rotating object having inertia, such as a capstan shaft, however, it is generally true that a time lag occurs in the servomechanism. In other words, there is a frequency response characteristic in which the response lowers against a frequency variation (due to tape wow/flutter) exceding a certain value (normally several Hz). So, it is usual that the exact response is made only in respect to a low frequency. Hence the regenerated signals from the rotary head are inconveniently subject to a variation in time base as converted from the delay of response in the capstan servomechanism. To correct this, a precision-type video tape recorder is so constructed as to have a higher precision of tape feeding mechanism with little wow/flutter of tape speed. Also, any jitters of the regenerated signals which are unable to be covered by the servomechanism after all are corrected by controlling an electrical circuit including a variable delay line. The above description concerns an example of a video tape recorder. But it is also suggested in the case of a precision-type tape recorder that control signals recorded at the time of recording are regenerated at the time of reproduction and compared with a different reference signal to thereby drive a servomechanism in such a manner as to match the tape feed at the time of reproduction with that at the time of recording.

Furthermore, the present invention relates to a compiling and recording system of image signals, and more particularly, to a helical-scan type video tape magnetic recording and reproducing system employing a rotary erasing head identical in form with the recording magnetic head to prevent the occurrence of unnecessary noises and flutters on the surface of a picture tube as a result of the reproducing operation of a magnetic medium compiled in such a way that a compiling and recording are done on arbitrary image signals including external synchronizing signals, the above-suggested tape speed control system being applied to the video tape magnetic recording and reproducing system to obtain a stable regenerated image. In addition, there is a demand for a video tape magnetic recording and reproducing system which can electronically perform a compiling operation, that is recording a content of a series of image signals on a magnetic medium by such as a video-recording device, replacing a section of the recorded portion by another content of image signals, and adding to a series of content another series of content.

In this case, it is required that there is no discontinuance or unnecessary duplication of image signal records at, or in the neighborhood of, a junction of compilation. This cannot be easily realized in a system in which image signals are recorded across the tape, oblique to the direction in which magnetic tape runs. It is also necessary to construct a servo loop that operates without being disturbed at the junction not only at the time of the above compiling operation but at the time of regenerating compiled and recorded signals, thus providing a stable reproduced image. For this purpose, it is desirable that the servo loop is of a simple construction in order to obtain a low-priced and small-sized apparatus. The present invention is concerned with the construction of a servomechanism for obtaining a stable reproduced image in the above-mentioned compiling operation.

An object of the present invention, therefore, is to improve the accuracy of tape feed by providing a capstan servomechanism for magnetic tape also at the time of recording operation of a video tape magnetic recording and reproducing system.

Another object of the present invention is to regenerate speed detection signals which are recorded for the purpose of establishing a capstan servomechanism for a recording operation and to carry out a reproducing operation through a tracking servomechanism synchronized with an external reference signal.

A further object of the present invention is to supply a servomechanism suitable for the above-mentioned electronic compilation of recorded information.

The above and other objects, features and advantages will be made apparent by the detailed description taken in conjunction with the accompanying drawings, in which.

Figure 1:
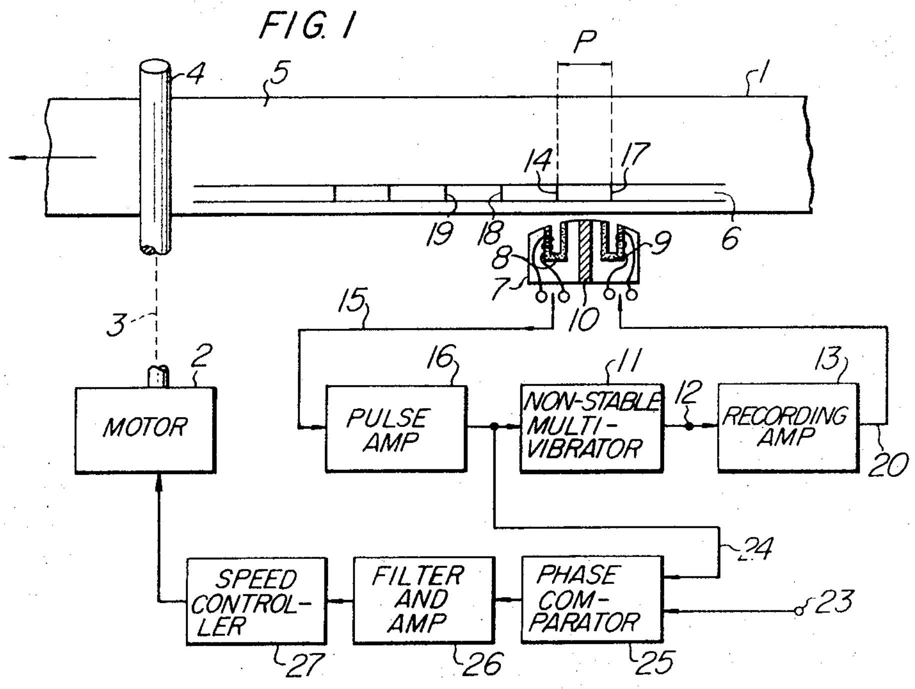
FIG. 1 is a block diagram showing a magnetic tape speed control system employed by the device according to this invention.

In FIG. 1, a magnetic tape 1 is driven by a capstan shaft 4 coupled direct, or through an appropriate coupling means 3 such as a belt (not shown in the figure), to a capstan motor while being pressed by, say, a pinch roller (not shown in the figure). A tape 1 is divided into an area 5 where information is recorded and a track 6 where control signals are additionally recorded. Opposite to the control track 6 is located a magnetic head assembly 7 with two heads 8 and 9 molded at a certain gap pitch. The reference numeral 10 designates a spacer for magnetic shield. The magnetic head assembly 7 is for the purpose of recording signals at regular intervals on the tape, signals being recorded as output signals 12 of a non-stable multivibrator 11 are recorded by the head 9 through the recording amplifier 13. The above-mentioned non-stable multivibrator 11 has the character of being switched in synchronism with a pulse signal of a frequency higher than its self-oscillating frequency. So, when a pulse signal locus 14 recorded by the head 9 passes the gap of the head 8 with the movement of tape, a regenerated pulse signal 15 is obtained. This signal, after being amplified by a pulse amplifier 16, triggers the non-stable multivibrator 11 to reverse its polarity, the above signal being recorded again as a recording locus 17 through the amplifier 13. As the tape travels, the above-mentioned procedure is repeated, recording on the control track variations in magnetization pattern, as shown in the reference numerals 18 and 19, corresponding to the polarity inversion of the non-stable multivibrator 11. It is to be noted here that if the value is appropriately selected for the tape feed, the gap pitch between the two heads and the self-oscillating frequency of the non-stable multivibrator 11, the signals are recorded on the tape strictly at such fixed intervals which are determined by the gap pitch P regardless of the variation in tape feed. In other words, a reference signal is recorded.

The reason why a non-stable multivibrator (instead of a flip-flop or a mono-stable multivibrator) is adopted, is to prevent any failure of continuous signal recording when a recording locus cannot be reproduced by the reproducing head 8 due to tape stoppage, dropouts or other causes.

Figure 3:
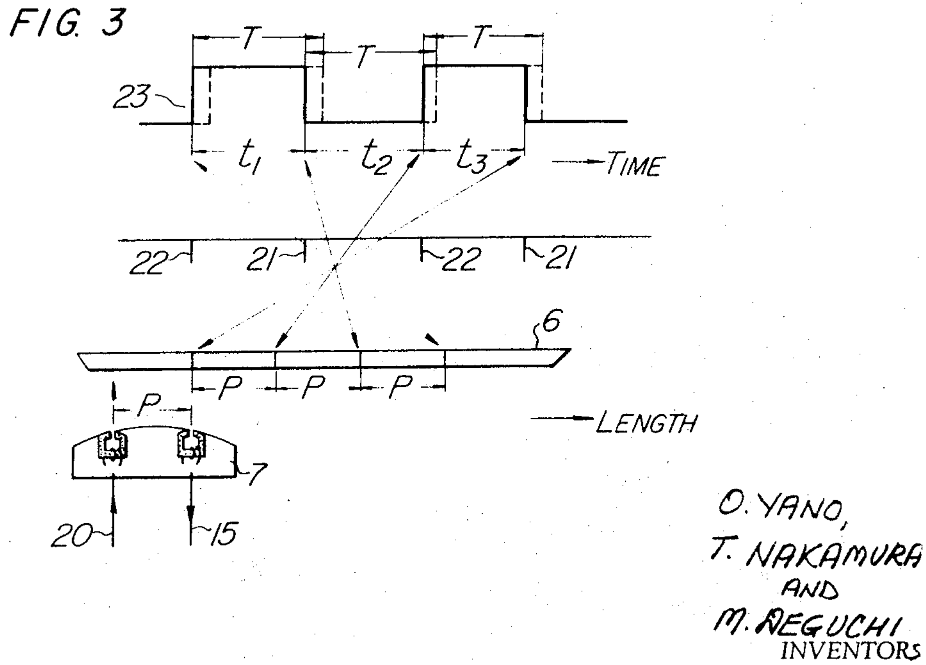
FIG. 3 is a drawing showing the loci of signals recorded at regular intervals by the two magnetic heads and the waveform of the speed signals, to explain the operation of the above speed control system.
Figure 2:
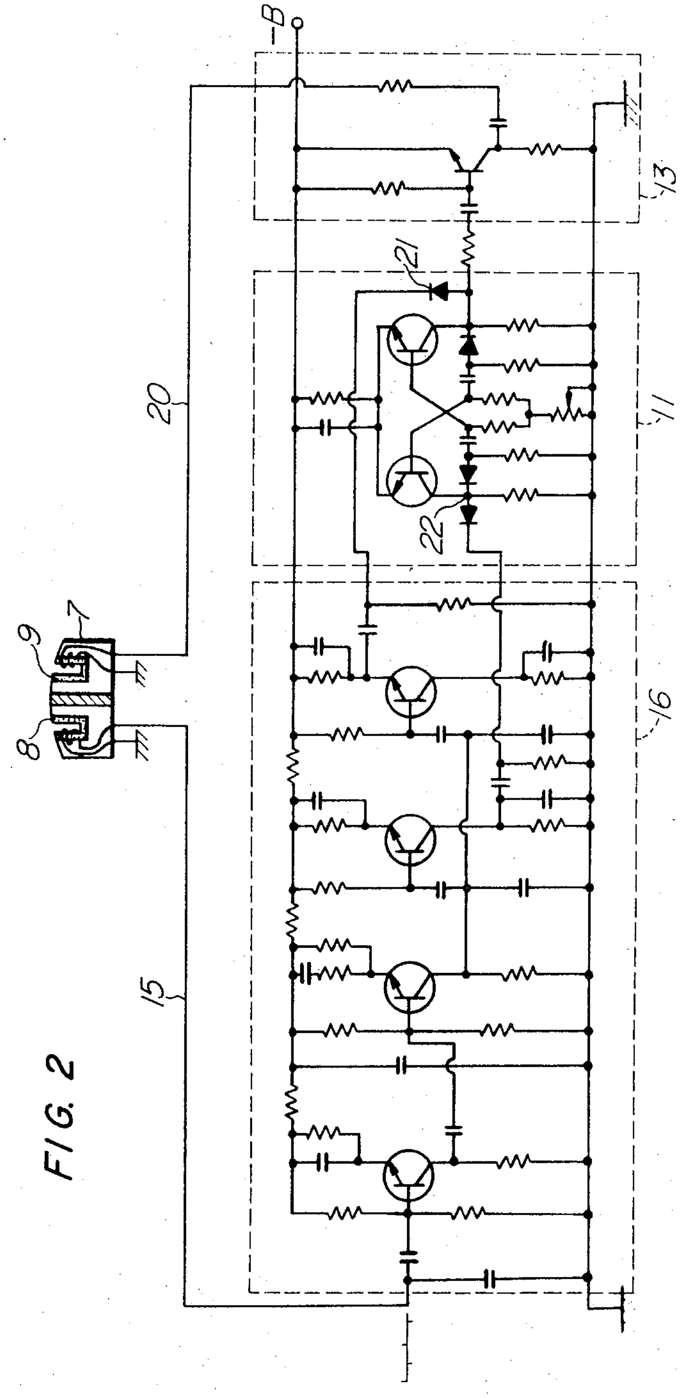
FIG. 2 is a diagram showing an electric wiring of the main parts of the above-mentioned speed control system.

If the effective pitch of the above head gap is P cm and a predetermined tape speed is V cm/sec, the oscillation frequency of the self-oscillator 11 has to be set at a value somewhat lower than V/2P Hz . . . (1) so that there is enough margin to permit the oscillation to start in synchronism with the regenerated signal 15 despite any variation in oscillation frequency due to a variation in a tape speed or a source voltage. Generally, the formula 1 may be V/2P x $n$(Hz) . . . (2), where $n$ may be either a positive integral number or one by a positive integral number. In this case ($n \neq 1$), the regenerated signal triggering the non-stable multivibrator 11 also includes the one not recorded just prior to the triggering. For example, if $n = 2$, the construction should be such that out of the regenerating signals (rise and fall) of the recording loci, only the fall signals perform the triggering, in which case the loci of triggering signals have regular intervals of length. FIG. 2 shows a system of regular-interval recording circuit described with reference to FIG. 1, and reference numerals there correspond to those in FIG. 1. In the formula 2, assume that a tape speed V = 30 cm/sec, that $n = 1$ and that a regenerated signal of 30 Hz frequency is required. Then, the effective gap pitch P (cm) between the two pitches will be P = 30/(2 × 30) × 1 = 0.1 cm. Consequently, the self-oscillation frequency of the non-stable multivibrator circuit 11 is set at a value (say, 28 Hz) slightly lower than 30 Hz. The rectangular wave current of 30 Hz is supplied to the recording head 9 as a signal 20 and the recording is made by the saturation on the magnetic tape. From the regenerating head 8 are obtained positive and negative pulses, they are amplified through the amplifier circuit system, and their polarity is inverted. After that, the negative pulses 21 and 22 trigger the two collectors of the non-stable multivibrator 11, thereby continually recording signals of 30 Hz at regular intervals on the control track 6. FIG. 3 shows a waveform of the non-stable multivibrator explained with reference to FIG. 2. The distance of $t_1$, $t_2$ and $t_3$ represent the time pitches of the waveform recorded, and T a half cycle of self-oscillation. The reference numerals 21 and 22 designate negative pulses which, after amplification and polarity inversion, trigger the above-mentioned non-stable multivibrator. It is required that the head assembly 7 which comprises a recording head and a reproducing head molded together is of such a construction that it is in close contact with the opposed magnetic tape by using a pressing means such as a pad.

The effective pitch of the gap between the magnetic heads means the value of P equivalent to an effective length of the signal locus on a control signal track recorded under the foregoing construction.

Now, an explanation will be made about the capstan speed control by means of the regular-interval recording signals. In FIG. 1, a phase comparison is made by a phase comparator 25 between an external reference frequency signal 23 (for instance, 30 Hz) and the signal 24 which is either the 30 Hz pulse signal of the reproducing head output signal 15 or the rectangular wave signal 12 of the non-stable multivibrator. The resulting error signal is passed through a low-pass filter and amplifier circuit 26, and is converted into a DC signal, which is supplied as a control input for a speed control circuit 27 of a DC motor 2. Thereby, the tape is driven at a speed corresponding to the frequency of the external signal 23. In this connection, the signal 24 which has detected the tape speed as described above absorbs the wow and flutter caused by the tape feeding mechanism. In one servomechanism for the capstan, it may be so arranged that an AC synchronous motor is driven by the amplified power of the output of a variable frequency oscillator and the variable frequency is controlled by the abovementioned phase error. In another servomechanism for the capstan, the arrangement may be such that an AC induction motor is equipped with an eddy-current brake, the current of which is controlled by the above-mentioned phase error.

Figure 4:
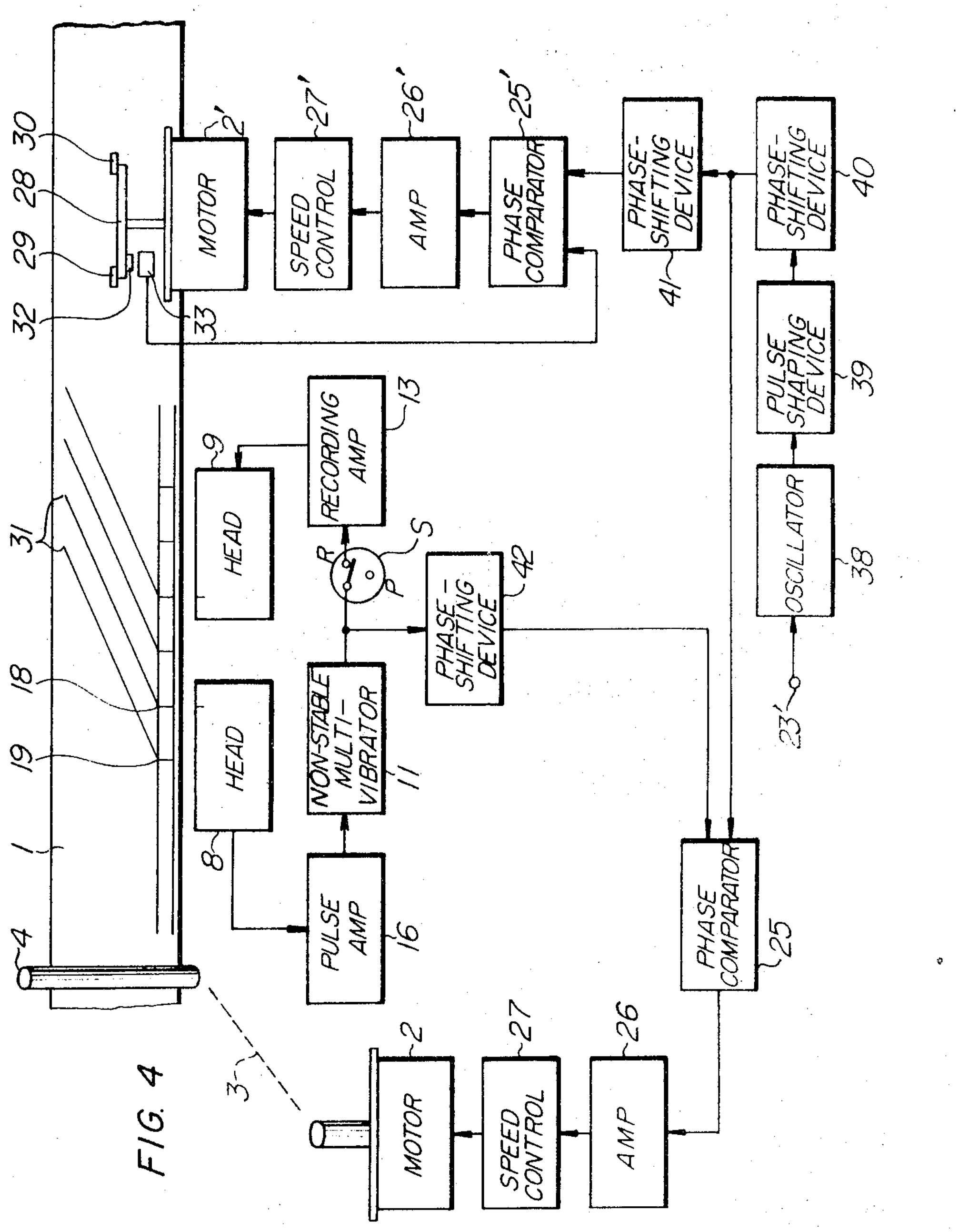
FIG. 4 is an electric block diagram showing a servomechanism for an embodiment according to the present invention.

Referring to FIG. 4 showing an embodiment of the present invention in which the foregoing controlling method is applied to a video tape magnetic recording and reproducing apparatus, a rotary head disc 28 has magnetic heads 29 and 30 placed at an angle of 180° with each other, and about one field of image signal corresponding to half a rotation of the magnetic heads is recorded and reproduced as one continuous oblique track 31. The rotary disc has such a construction as, for example, the capstan servomechanism mentioned above. And a comparison is made by the phase comparator 25' between two signals, one of which is a signal obtained by modification of a 30 Hz signal 23' through an oscillator 38, a pulse shaping device 39 and phase shifting devices 40 and 41. The 30 Hz signal 23' is obtained by, for example, dividing in two a vertical synchronizing signal of the image signal and is applied to trigger the oscillator 38. The other of the two signals is a detection signal produced from a fixed detection head 33 by magnetic coupling between the detection head 33 and a permanent magnet 32 provided on the head disc 28, which coupling occurs once every rotation of the head disc 28. The resulting error signal is supplied to a speed control circuit 27' as a speed control input through a low-pass filter and amplifier circuit 26' to drive a DC motor 2' synchronously with the signal 23' related to a synchronous signal.

Therefore, it follows that the regular-interval loci 18 and 19 recorded by the head 8 and the image signal loci 31 recorded by the rotary heads 29 and 30 are in a specified relation in terms of location to each other. At the time of reproduction, a switch S is opened so as to prevent the head 9 from performing a new recording operation, and the loci 18, 19, . . . and so on which are recorded at regular intervals of location at the time of recording are regenerated by the head 8. The signal thus regenerated is brought to a phase comparator circuit 25 together with the output of the oscillator 38 (the output synchronized by an external signal or the output of the self-oscillator) which is a reference signal for reproduction, and the output of the phase comparator 25 controls the synchronism of the capstan motor 2 in such a way that both the signals have a specified phase relation.

On the other hand, the rotary head disc 28 is rotated at the number of rotations almost equivalent to that at the time of recording by making a comparison between the output of the oscillator and that of the detection head 33.

In other words, the idea is that the regular-interval signal loci 18 and 19 are used not only as signals for a capstan servomechanism at the time of recording but also as signals for a tracking servomechanism for the image track 31 at the time of reproduction, thus achieving a tracking servomechanism for the image track 31 by means of the capstan servomechanism. The reference numeral 42 designates a phase shifting device to be used for correcting the tracking at the time of reproduction.

In performing a so-called tape compilation in which new image signals are recorded on the portion of the magnetic tape immediately following the loci already recorded, the oscillator 38 is driven synchronously with a vertical synchronous signal of image signals to be newly recorded, and the resulting output is used as a reference signal to control and drive, for the purpose of regeneration, the capstan and the rotary head similarly as at the time of ordinary reproduction as mentioned above.

Figure 5:
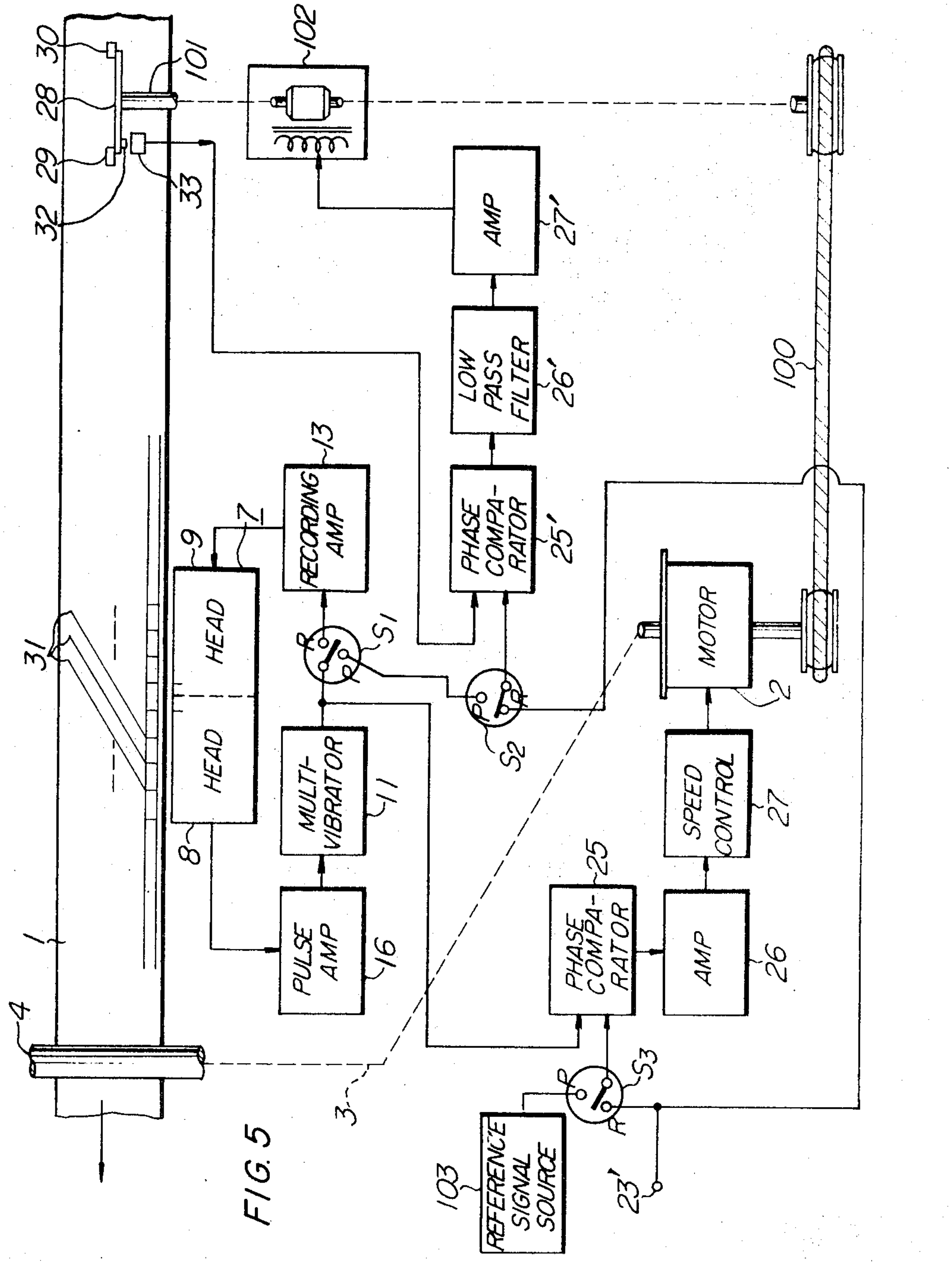
FIG. 5 is an electric block diagram showing another embodiment of the present invention.

Consequently, in this case, the phase of an image signal to be reproduced coincides with that of an image signal to be recorded. If the operation of the apparatus is switched from reproduction to recording in this condition, new image signals can be recorded as a magnetization pattern in the same phase relation with a magnetization pattern for already recorded signals. For this reason, there occurs at the time of reproduction no fluttering of images which are otherwise caused by the disorderly operation of a servomechanism at this junction. FIG. 5 shows another embodiment, in which the rotary head disc 28 holds the magnetic heads 29 and 30 arranged at an angle of 180° with each other. The embodiment is of such a construction that about one field or frame of an image signal, corresponding to half a rotation of the rotary head disc, is recorded and reproduced in one continuous oblique track. At the time of recording, the signal 23' related to the vertical synchronous signal of image signals to be recorded and the output of the multivibrator 11 constructed as in FIG. 1 are led to the phase comparator 25. The capstan motor 2 is subsequently controlled in the same way.

In the meantime, the rotary head disc 28 is driven by the capstan motor through an elastic belt 100, while the phase of the detection signal related to the rotational phase of the rotary head disc 28, which is supplied through the detection head 33 located in opposition to the magnet 32 on the rotary head disc 28, is compared with the above-mentioned phase signal 23' by the phase comparator 25'. Then, through the low-pass filter 26' and the current amplifier 27', an error output is led to the eddy current brake 102 on the rotary head disc driving shaft 101. By controlling the braking force of the eddy current brake 102, the rotary head disc 28 is brought into a specified phase relation with the signal 23', mainly taking advantage of the elastic slip phenomenon of the belt 100.

As a result, the loci 18, 19, . . . which are recorded at regular intervals by the head 9 maintain a specified relation of location with the image signal loci 31 recorded by the rotary heads 29 and 30.

At the time of reproduction, the switch S1, is opened to prevent the head 9 from carrying out a further recording operation, and the loci 18, 19, . . . which are recorded at regular intervening spaces at the time of recording is reproduced by the head 8. The output of the multivibrator 11 in a fixed phase relation with the reproduction signal together with the output of the head 33 for detection of the rotary head position are led to the phase comparator circuit 25', and the rotational phase of the rotary head disc 28 is so controlled as to form a specified phase relation between the two signals.

Also, as to the capstan 4, in performing the electronic compilation, the output of the reference signal source 103 having the same frequency as the signal 23', such as the vertical synchronous signal of image signals to be newly recorded, is led to the phase comparator 25 together with the output of the said multivibrator 11 to drive the capstan at a fixed speed.

That is to say, the regular-interval signal loci 18 and 19 are used both as a signal for the capstan servomechanism for recording purposes and as a signal for the tracking servomechanism for the image tracks 31 at the time of reproduction, with the intention of establishing a tracking servomechanism for the image tracks 31 by controlling the rotational phase of the rotary head.

As can be seen from the above, the present invention makes it possible to run the driving mechanism at a constant speed, correcting wow and flutter, without any special need to increase the precisions of the mechanism irrespective of the wear of the driving mechanism and a change in surrounding conditions as well as the lapse of time. Therefore, good recording and reproducing results can be expected.

In addition, because the reproduction work can be performed in synchronism with an external reference signal, a satisfactory tape compilation is accomplished.

What is claimed is:

1. A video tape magnetic recording and reproducing system, comprising:

a magnetic recording medium;

first and second magnetic head means disposed adjacent said magnetic recording medium in operative engagement therewith, said second magnetic head means being located at a predetermined distance in a running direction of said magnetic recording medium away from said first magnetic head means;

means, including an oscillator connected to said first magnetic head means, for recording a signal on said magnetic record medium through said first magnetic head means;

means applying the output signal of said second magnetic head means to said oscillator, wherein the frequency of oscillation of said oscillator, and therefore of the signal recorded on said magnetic recording medium, is controlled by the frequency of said output signal of said second magnetic head means;

means, including rotating magnetic head means, for successively recording video image signals on and reproducing them from a continuous recording track oblique to the longitudinal direction of movement of said magnetic recording medium;

means, including a first comparator circuit, for comparing the output of said oscillator with a signal having the same frequency as the vertical synchronizing signal component of said video image signal;

means, including a phase detector, for detecting the phase of rotation of said rotating magnetic head means;

means, including a second comparator circuit, for comparing the output of said phase detector with said signal having the same frequency as said vertical synchronizing signal during the record mode of operation of said system;

means, including said second comparator circuit, for comparing the output of said phase detector with said output of said oscillator during the reproduce mode of operation of said system; and means applying the output of said second comparator circuit to said rotating magnetic head means to control the rotation thereof.

2. A video tape magnetic recording and reproducing system, comprising:

a magnetic recording medium;

first and second magnetic head means disposed adjacent said recording medium in operative engagement therewith, said second magnetic head means being located at a predetermined distance in a running direction of said magnetic recording medium away from said first magnetic head means;

means for driving said magnetic recording medium past said first and second magnetic head means;

means, including an oscillator having the characteristics of a nonstable multi-vibrator connected to said first magnetic head means, for recording a signal on said magnetic recording medium through said first magnetic head means;

means applying the output signal of said second magnetic head means to said oscillator, wherein the frequency of oscillation of said oscillator, and therefore of the signal recorded on said magnetic recording medium through said first magnetic head means, is controlled by the frequency of said output signal of said second magnetic head means;

means, including rotating magnetic head means, for successively recording video image signals on and reproducing them from a continuous recording track oblique to the longitudinal direction of movement of said magnetic record medium;

means for comparing the output of said second magnetic head means with a signal having the same frequency as the vertical synchronizing signal component of said video image signal; and means applying the output of said comparing means to said driving means.

* * * * *